(12) United States Patent
Christensen et al.

(10) Patent No.: US 11,603,882 B2
(45) Date of Patent: Mar. 14, 2023

(54) BEARING UNIT FOR A YAWING SYSTEM OF A WIND TURBINE

(71) Applicant: Vestas Wind Systems A/S, Aarhus N. (DK)

(72) Inventors: Flemming Christensen, Hinnerup (DK); David Österberg, Horsens (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/260,343

(22) PCT Filed: Sep. 2, 2019

(86) PCT No.: PCT/DK2019/050258
§ 371 (c)(1),
(2) Date: Jan. 14, 2021

(87) PCT Pub. No.: WO2020/064068
PCT Pub. Date: Apr. 2, 2020

(65) Prior Publication Data
US 2021/0293224 A1 Sep. 23, 2021

(30) Foreign Application Priority Data
Sep. 26, 2018 (DK) .............................. PA 2018 70627

(51) Int. Cl.
*F16C 17/10* (2006.01)
*F03D 80/50* (2016.01)
(Continued)

(52) U.S. Cl.
CPC .......... *F16C 17/107* (2013.01); *F03D 7/0204* (2013.01); *F03D 80/50* (2016.05);
(Continued)

(58) Field of Classification Search
CPC ...... F16C 17/04; F16C 17/107; F16C 17/246; F16C 23/02; F16C 23/048; F16C 25/02;
(Continued)

(56) References Cited

U.S. PATENT DOCUMENTS 10,584,685 B2 * 3/2020 Brencher ................ F16C 17/03
10,711,792 B2 * 7/2020 Vidalenc ................ F16C 23/02
(Continued)

FOREIGN PATENT DOCUMENTS

CN 201650589 U 11/2010
CN 102825420 A 12/2012
(Continued)

OTHER PUBLICATIONS

Danish Patent and Trademark Office, Search and Examination Report in PA 2018 70627, dated Mar. 7, 2019.
(Continued)

*Primary Examiner* — James Pilkington
(74) *Attorney, Agent, or Firm* — Wood Herron & Evans LLP (57) ABSTRACT

A bearing unit of a yawing system of a wind turbine having a tower and a nacelle connected by the yawing system. The bearing unit includes an adjuster element moveably secured to the bearing unit, a body element translatable relative to the adjuster element, a bearing element in contact with the body element, and a biasing means positioned between the body element and the adjuster element for applying a tension force to the bearing unit. The adjuster element adjusts the tension force applied to the bearing unit through translation of the body element, and respective surfaces of the adjuster element and the body element are visible during use.

18 Claims, 8 Drawing Sheets

(51) Int. Cl.
  *F03D 80/70* (2016.01)
  *F03D 7/02* (2006.01)
  *F16C 27/02* (2006.01)
  *F16C 33/04* (2006.01)

(52) U.S. Cl.
  CPC .............. *F03D 80/70* (2016.05); *F16C 27/02* (2013.01); *F16C 33/046* (2013.01); *F05B 2240/50* (2013.01); *F16C 2360/31* (2013.01)

(58) Field of Classification Search
  CPC ........ F16C 25/04; F16C 27/02; F16C 33/046; F16C 2360/31; F05D 2240/50; F03D 80/50; F03D 80/70
  See application file for complete search history.

(56) References Cited

U.S. PATENT DOCUMENTS

| | | | |
|---|---|---|---|
| 10,781,797 B2* | 9/2020 | Sorensen | ................ F16C 25/04 |
| 2011/0057451 A1 | 3/2011 | Volmer et al. | |
| 2012/0224799 A1 | 9/2012 | Wagner | |

FOREIGN PATENT DOCUMENTS

| | | |
|---|---|---|
| CN | 207049230 U | 2/2018 |
| DE | 102007056763 A1 | 12/2008 |
| EP | 2488767 A1 | 8/2012 |
| EP | 3433491 A1 | 1/2019 |
| KR | 20110093115 A | 8/2011 |
| TW | 201102494 A | 1/2011 |
| WO | 2011045435 A1 | 4/2011 |
| WO | 2016183045 A1 | 11/2016 |
| WO | 2017162250 A1 | 9/2017 |

OTHER PUBLICATIONS

European Patent Office, International Search Report and Written Opinion in PCT Application No. PCT/DK2019/050258, dated Dec. 4, 2019.
China National Intellectual Property Administration, First Notification of Office Action in CN Application No. 201980059789.9, dated Feb. 25, 2022.
China National Intellectual Property Administration, 2nd Notification of Office Action in CN Application No. 201980059789.9, dated Jun. 29, 2022.
Intellectual Property India, Examination Report in IN Application No. 202117008854, dated Aug. 24, 2022.
European Patent Office, Examination Report in EP Application No. 19765174.8, dated Oct. 6, 2022.

* cited by examiner

BEARING UNIT FOR A YAWING SYSTEM OF A WIND TURBINE

This application is a U.S. National Phase of PCT Application No. PCT/DK2019/050258, filed Sep. 2, 2019 (expired), which claimed priority to Danish Patent Application No. PA 2018 70627, filed Sep. 26, 2018, the disclosures of which are incorporated by reference herein in their entirety.

FIELD OF THE INVENTION

This invention generally relates to the field of bearing units for wind turbines. In particular, it relates to a bearing unit for a yawing system of a wind turbine.

BACKGROUND

Wind turbines known in the art include yawing systems comprising a gear ring supported by a plurality of bearing units held in an array of bearing assemblies. The bearing units are designed to contact the gear ring to stabilise movement of the yawing system, and are tensioned upon installation to maintain the necessary contact during use. The bearing units are inspected periodically to check whether they are correctly tensioned and/or need to be replaced or repaired, as necessary. In order to access the bearing units during an inspection, at least part of the bearing assembly needs to be dismantled. This can be cumbersome, time consuming, and labour intensive.

It is against this background that the invention has been devised.

STATEMENTS OF INVENTION

According to a first aspect of the invention, there is provided a bearing unit for a bearing assembly of a yawing system of a wind turbine, the wind turbine comprising a tower and a nacelle connected by the yawing system, wherein the yawing system comprises a gear ring comprising gear-toothed arrangement configured to interact with a gear wheel of a motor to allow orientation of the nacelle with respect to the tower, the bearing unit comprising: an adjuster element arranged to be moveably secured to the bearing assembly; a body element translatable relative to the adjuster element; a bearing element in contact with the body element, the bearing element comprising a bearing surface for contacting a surface of the gear ring during use; and, a biasing means positioned between the body element and the adjuster element for applying a tension force to the bearing unit to bias the bearing element into contact with the surface of the gear ring during use, wherein the adjuster element is configured to adjust the tension force applied to the bearing unit by controlling the translation of the body element, the bearing unit being configured such that respective surfaces of the adjuster element and the body element are visible during use.

Preferably, the biasing means is configured to apply a predetermined tension force to the bearing unit when the bearing unit is installed in the bearing assembly prior to use, and wherein the bearing unit is configured such that the respective surfaces of the adjuster element and the body element are coplanar when the predetermined tension force is applied.

Preferably, when the bearing unit is installed in the bearing assembly the surface of the body element is configured to move upwards or downwards relative to surface of the adjuster element to indicate that tension force applied to the bearing unit has decreased.

Preferably, the respective surfaces comprise end surfaces of the adjuster element and the body element.

Preferably, the body element comprises a stem and the adjuster element comprises an open bore through which the stem is slidably received.

Preferably, the stem comprises a retaining means arranged to limit the translation of the body element away from the adjuster element.

Preferably, the adjuster element comprises an inner surface for limiting the translation of the body element towards the adjuster element.

Preferably, the bearing surface is arranged to contact a lower surface or an upper surface of the gear ring during use.

According to a second aspect of the invention, there is provided a bearing assembly for a yawing system of a wind turbine comprising a bearing unit according to the first aspect of the invention. Preferably, the bearing assembly is a slide, ball or roller bearing assembly.

According to a third aspect of the invention, there is provided a yawing system for a wind turbine comprising a bearing assembly according to the second aspect of the invention.

Preferably, the yawing system comprises a control unit configured to determine a translation of the body element with respect to the adjuster element; and, on determining that the body element has translated, issue a maintenance control signal.

Preferably, if it is determined that the body element has moved away from to the adjuster element the maintenance control signal is configured to indicate a deterioration of the bearing element, and if is determined that the body element has moved towards the adjuster element the maintenance control signal is configured to indicate the biasing means needs replacing.

According to a fourth aspect of the invention, there is provided a wind turbine comprising a yawing system according to the third aspect of the invention.

BRIEF DESCRIPTION OF THE DRAWINGS

The above and other aspects of the invention will now be described, by way of example only, with reference to the accompanying drawings, in which.

In the drawings, like features are denoted by like reference signs.

SPECIFIC DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilised, and structural and logical changes may be made without departing from the scope of the invention as defined in the appended claims. Moreover, references in the following description to "upper", "lower" and any other terms having an implied orientation are not intended to be limiting, and refer only to the orientation of the features as shown in the accompanying drawings.

Figure 1:
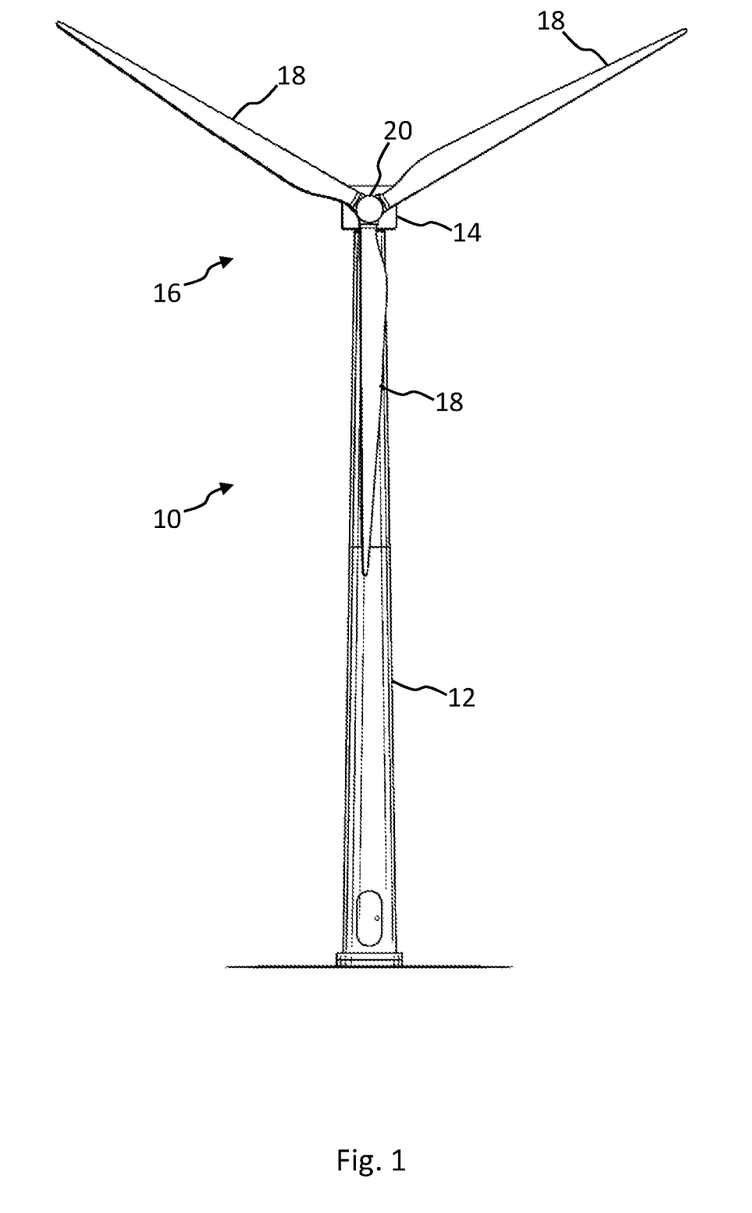
FIG. 1 is a schematic view of a wind turbine for use with the invention.

To provide context for the invention, FIG. 1 shows a wind turbine, generally designated as 10, comprising a tower 12. The tower 12 supports a nacelle 14, to which a rotor 16 is mounted. The rotor 16 is operatively coupled to a generator housed inside the nacelle 14. In addition to the generator, the nacelle 14 houses other miscellaneous components required for converting wind energy into electrical energy, along with various other components needed to operate, control, and optimise the performance of the wind turbine 10. The rotor 16 comprises a plurality of rotor blades 18 extending radially from a central hub 20. In this example, the rotor 16 comprises three rotor blades 18, although it will be apparent to those skilled in the art that other configurations are possible. The wind turbine 10 further comprises a yawing system (not shown), positioned between the tower 12 and the nacelle 14. The yawing system functions to rotate the nacelle 14 relative to the tower 12 in a yawing movement so as to orientate the rotor 16 according to wind direction.

Figure 2:
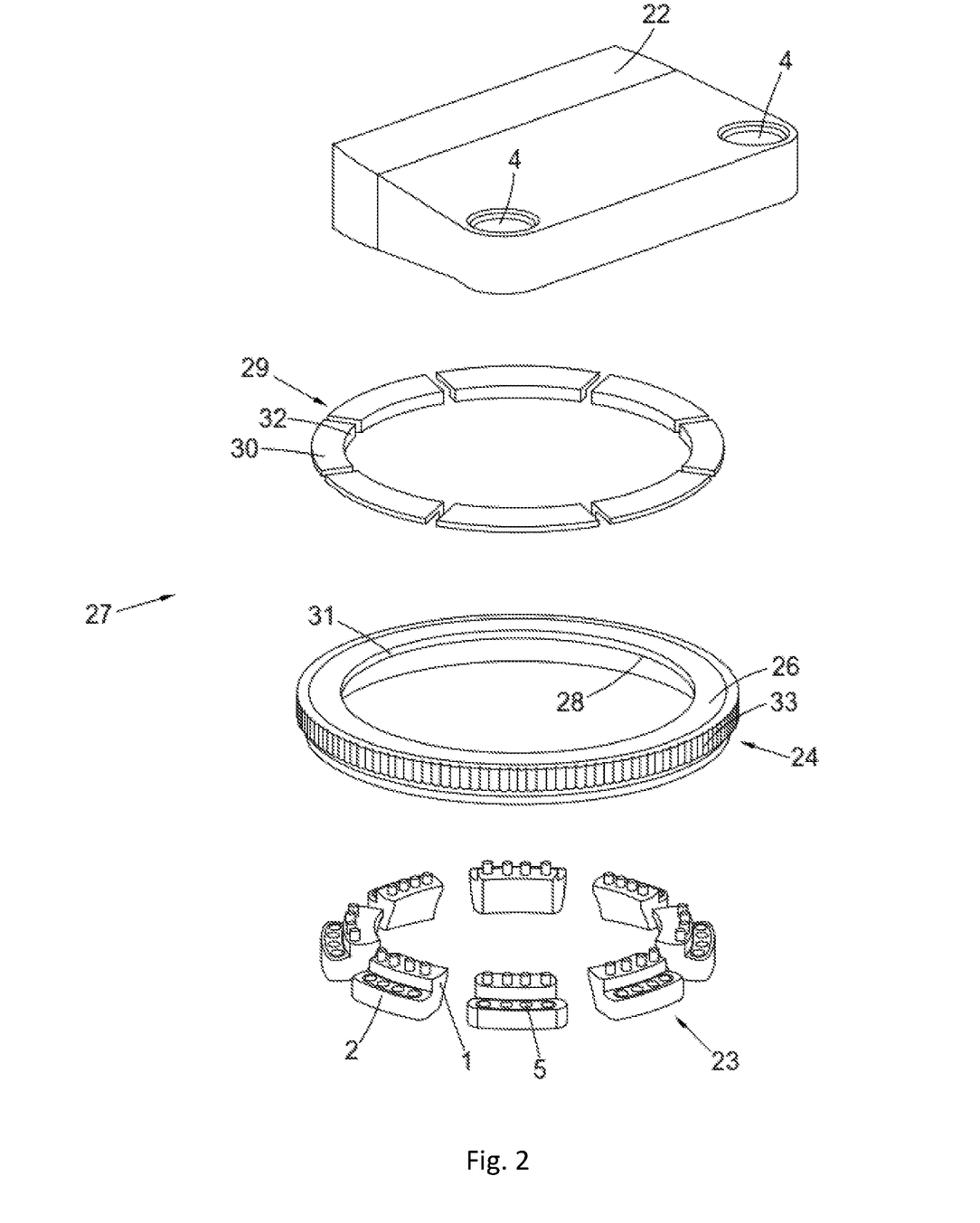
FIG. 2 shows an exploded view of a yawing system of the wind turbine shown in FIG. 1.

FIG. 2 is an exploded view of an embodiment of the yawing system, which is generally designated by 27. The yawing system 27 comprises a mainframe 22, on which all the mechanical and electric elements of the nacelle 14 are assembled. At least one motor (not shown) is mounted to the mainframe 22 and is configured to drive the yawing movement of the nacelle 14. This embodiment of the yawing system 27 comprises two apertures 4 arranged to receive respective motors.

The yawing system 27 further comprises a gear ring, generally designated by 24, configured to be fixedly secured to the top of the tower 12. The outer radial surface of the gear ring 24 defines a gear-toothed arrangement 33 for interacting with a gear wheel secured to the at least one motor to enable the yawing movement of the mainframe 22 with respect to the gear ring 24. The gear ring 24 further comprises an upper circumferential bearing surface 26 (hereinafter, "the upper surface 26"), upon which the mainframe 22 rests and slides when undergoing the yawing movement, a lower circumferential bearing surface 28 (hereinafter, "the lower surface 28") and an inner radial bearing surface 31 (hereinafter, "the inner surface 31"), vertically extending between the upper and lower surfaces 26, 28.

A plurality of sliding plates, generally designated by 29, are located between the mainframe 22 and the gear ring 24 in a radial arrangement. The sliding plates 29 are fixed relative to the mainframe 22 and provide smooth, near-frictionless, surfaces enabling the mainframe 22 to slide on the upper surface 26 during the yawing movement. The sliding plates 29 each include a horizontal sliding plate 30 and a radial sliding plate 32. The horizontal sliding plates 30, on which axial forces are exerted during the yawing movement of the mainframe 22, are positioned between the mainframe 22 and the upper surface 26 of the gear ring 24. Whereas the radial sliding plates 32, on which radial forces are exerted during the yawing movement of the mainframe 22, are positioned between respective bearing assemblies 23, arranged to be fixed to the mainframe 22 in a radial arrangement, and the inner surface 31 of the gear ring 24. In the embodiment shown in FIG. 2, eight bearing assemblies 23 are arranged radially around the gear ring 24. In a preferred embodiment, it is intended that the material of the sliding plates 30, 32 is a polymer, for instance PET or PA.

Figure 3:
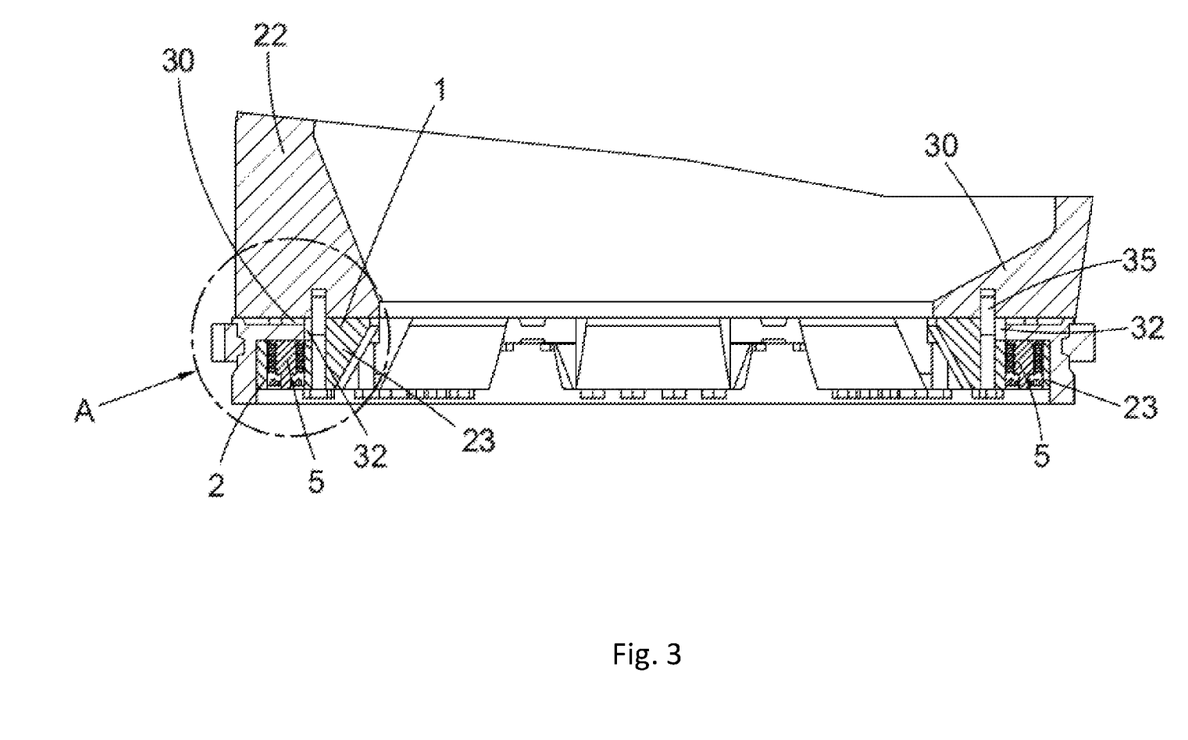
FIG. 3 is a cross-sectional, assembled view of the yawing system shown in FIG. 2.

FIG. 3 is a cross-sectional view of the yawing system 27 when assembled. In this figure, only two bearing assemblies 23 are visible in cross section, and are shown located on opposite sides of the gear ring 24. Likewise, only two horizontal sliding plates 30, positioned between the mainframe 22 and the upper surface 26 of the gear ring 24, and only two vertical sliding plates 32, positioned between respective bearing assemblies 23 and the inner surface 31 of the gear ring 24, are visible, and are also shown at opposite sides of the gear ring 24. Each bearing assembly 23 has a generally vertical first portion 1 and a horizontal second portion 2, secured to and extending radially outwards from the first portion 1. When the yawing system 27 is assembled, the first portions 1 are fixed to the mainframe 22 by means of screws 35 and are located around the inner surface 31 of the gear ring 24, adjacent the radial sliding plates 32. The second portions 2 extend below the gear ring 24, generally parallel to the lower surface 28 of the gear ring 24. Each second portion 2 is arranged to carry a plurality of bearing units 5 that act to impart a force on the lower surface 28 of the gear ring 24 to stabilise the yawing movement of the mainframe 22. Preferably, the second portion 2 of each bearing assembly 23 holds between four and six bearing units 5.

Figure 4:
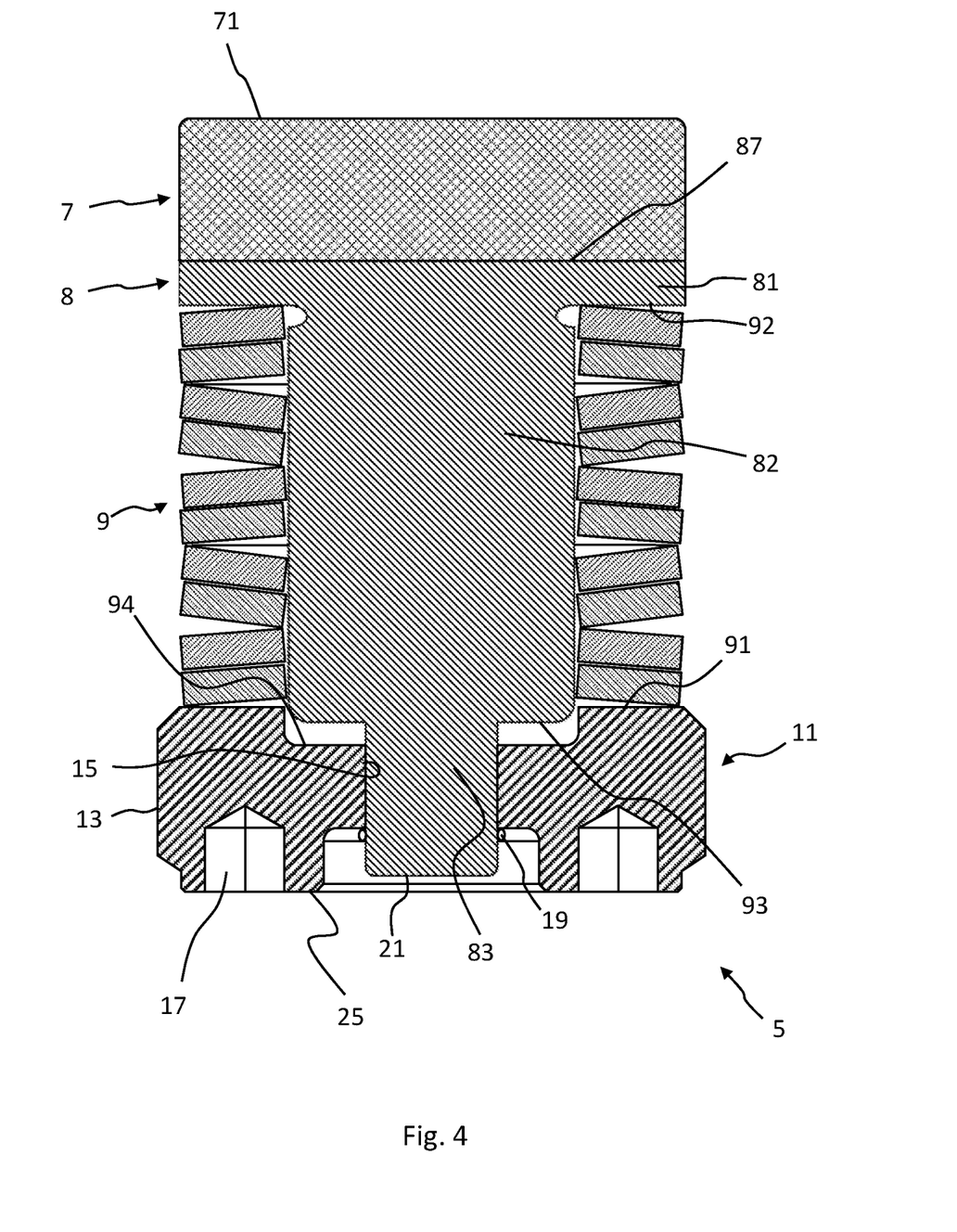
FIG. 4 is a cross-sectional view of a bearing unit according to an embodiment of the invention for use in the yawing system shown in FIG. 2.

FIG. 4 is a cross-sectional view of an embodiment of a bearing unit 5 in accordance with the invention prior to its installation within a bearing assembly 23. The bearing unit 5 is generally cylindrically-shaped and comprises a number of concentrically arranged components including a bearing element 7, in the form of a cylindrical block, comprising a bearing surface 71 for contacting the lower surface 28 of the gear ring 24 during use. The bearing unit 5 further comprises a generally cylindrical body element 8. According to the orientation of the bearing unit 5 as shown in FIG. 4, the bearing element 7 contacts an upper surface 87 of the body element 8 such that the bearing surface 71 and the upper surface 87 are in a parallel alignment. The body element 8 sits centrally within the bearing unit 5 and comprises an upper portion 81, which defines the upper surface 87 of the body element 8, a central portion 82 and a lower stem 83. The upper portion 81 is connected to the central portion 82 in a concentric arrangement, which is in turn connected to the stem 83. The diameter of the central portion 82 is less than the diameter of the upper portion 81 so as to define a first annular surface 92 in a lower surface of the upper portion 81. Similarly, the diameter of the stem 83 is less than the diameter of the central portion 82 so as to define an annular contact surface 93 in a lower surface of the central portion 82.

The bearing unit 5 further comprises an annular-shaped adjuster element 11 located at the opposite end to the bearing element 7. The adjuster element 11 includes an external screw thread 13, located on its outer radial surface for securing the bearing unit 5 in the bearing assembly 23, together with a centrally located open bore 15 configured to slidably receive the stem 83. The adjuster element 11 further comprises an end surface 25 (e.g., a first indicator surface), which includes at least two tool sockets 17 for receiving an adjustment tool (not shown in the figures), and an inner surface 94, which comprises a second annular surface 91.

The bearing unit 5 further comprises a biasing means positioned between the adjuster element 11 and the upper portion 81 of the body element 8. In this embodiment of the bearing unit 5, the biasing means comprises a stack of annular disc springs 9 (hereinafter, "the spring stack 9") positioned around the central portion 82 of the body element 8 between the adjuster element 11 and its upper portion 81. In the orientation of the bearing unit as shown in FIG. 4, the upper and lower ends of the spring stack 9 abut the first and second annular surfaces 92, 91 respectively to exert a tension force on the bearing unit 5, urging the body element 8, and so the bearing element 7, away from the adjuster element 11 in a translatory movement.

The stem 83 of the body element 8 includes a retaining means arranged to limit translation of the body element 8 upwards relative to the adjuster element 11. That is, the retaining means limits translation of the body element 8 away from the adjuster element 11. In a preferred embodiment, the retaining means is a circlip 19 located around the outer radial surface of the stem 83 of the body element 8 and is configured to abut the end surface 25 of the adjuster element 11 to limit the extent to which the body element 8 can translate away from the adjuster element 11. Conversely, the annular contact surface 93 is configured to abut the inner surface 94 of the adjuster element 11 so as to limit the extent to which the body element 8 can translate downwards relative to the adjuster element 11. That is, the annular contact surface 93 of the body element 8 and the inner surface 94 of the adjuster element 11 function to limit the translation of the body element 8 towards the adjuster element 11.

Figure 5A:
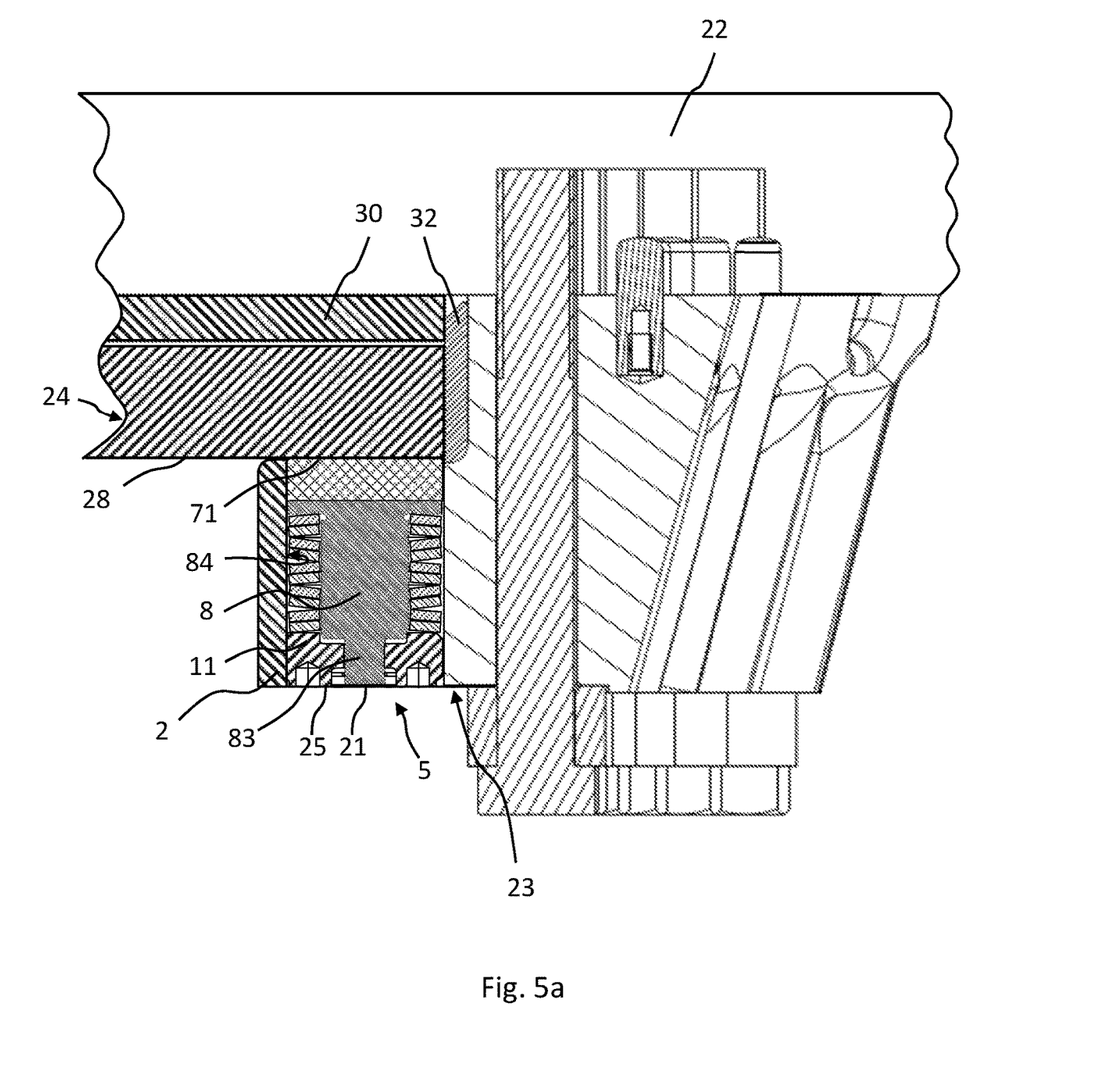
FIG. 5a is a cross-sectional view of the bearing unit of FIG. 4, installed in the yawing system of FIG. 2, correctly tensioned.

FIG. 5a is an enlargement of detail 'A' shown in FIG. 3, and shows the bearing unit 5 installed within the bearing assembly 23. The second portion 2 of each bearing assembly 23 includes a number of cylindrical bores 84 for receiving a respective bearing unit 5. Each bore 84 comprises an internal screw thread (not shown), which forms an adjustable screw thread connection with the external screw thread 13 of the bearing unit 5 to hold the bearing unit 5 within the bearing assembly 23.

The adjustable screw thread connection allows the adjuster element 11 to be moved relative to the body element 8 within the bore 84 by rotating the adjuster element 11 about a longitudinal axis of the bearing unit 5. In order to adjust the force imparted by the bearing surface 71 on the lower surface 28 of the gear ring 24, the adjuster element 11 can be rotated clockwise or anticlockwise within the bore 84. Rotating the adjuster element 11 clockwise causes it to move upwards relative to the body element 8 since upward movement of body element 8 is prevented by the bearing surface 71 being in contact with the lower surface 28. This has the effect of compressing the spring stack 9, which causes it to impart a greater tension force on the bearing unit 5, thereby increasing the force imparted by the bearing surface 71 on the lower surface 28 of the gear ring 24. Whereas, rotating the adjuster element 11 anticlockwise has the opposite effect. That is, the adjuster element 11 moves downwards relative to the body element 8, uncompressing the spring stack 9. This decreases the tension force applied to the bearing unit 5 and consequently the force imparted by the bearing surface 71 on the lower surface 28.

In order to ensure that the bearing surface 71 imparts the necessary stabilising force on the lower surface 28 of the gear ring 24, the tension of the bearing unit 5 must be correctly adjusted upon installation in the bearing assembly 23 prior to use.

In known bearing units, a biasing means is configured to provide a correct or predetermined tension force when an adjuster element is rotated back a predetermined amount from its uppermost position. That is, the adjuster element is rotated clockwise to its uppermost position, overly compressing the biasing means, and then rotated anticlockwise away from the uppermost position by the predetermined amount, which might be half a turn, for example. It is at this position that the bearing unit is known to be adjusted to the correct tension force. However, known bearing units are fully housed within their bearing assembly, meaning that the adjuster element can only be accessed by removing part of the bearing assembly. This makes the process of accessing and adjusting the adjuster element cumbersome and time consuming.

The bearing unit 5 of this invention is configured such that the adjuster element 11 and the stem 83 are visible and accessible from underneath the bearing assembly 23 when the bearing unit 5 is installed in the bearing assembly 23. This arrangement allows for straightforward adjustments of the adjuster element 11, unlike known bearing units.

The spring stack 9 is configured to apply the correct or predetermined tension force to the bearing unit 5 when the adjuster element 11 is rotated until its end surface 25 is substantially coplanar with the end surface 21 (e.g., a second indicator surface) of the stem 83, as shown in FIG. 5a. That is, the alignment of the end surfaces 21, 25 provides a visual indication that the bearing unit 5 is correctly tensioned to provide the necessary stabilising force on the lower surface 28 of the gear ring 24 prior to use.

Over its working lifetime, the bearing unit 5 can fail to provide the necessary stabilising force. This might be because the bearing element 7 has deteriorated and/or the spring stack 9 has broken. As a result, each bearing unit 5 has to monitored to determine whether or not the adjuster element 11 needs to be adjusted, to account for deterioration of the bearing surface 71, or whether the spring stack 9 needs replacing. In both instances, the type of failure can be diagnosed, without removing the bearing unit 5 from the bearing assembly 23, by inspecting the position of the end surfaces 21, 25 with respect to each other.

Figure 5B:
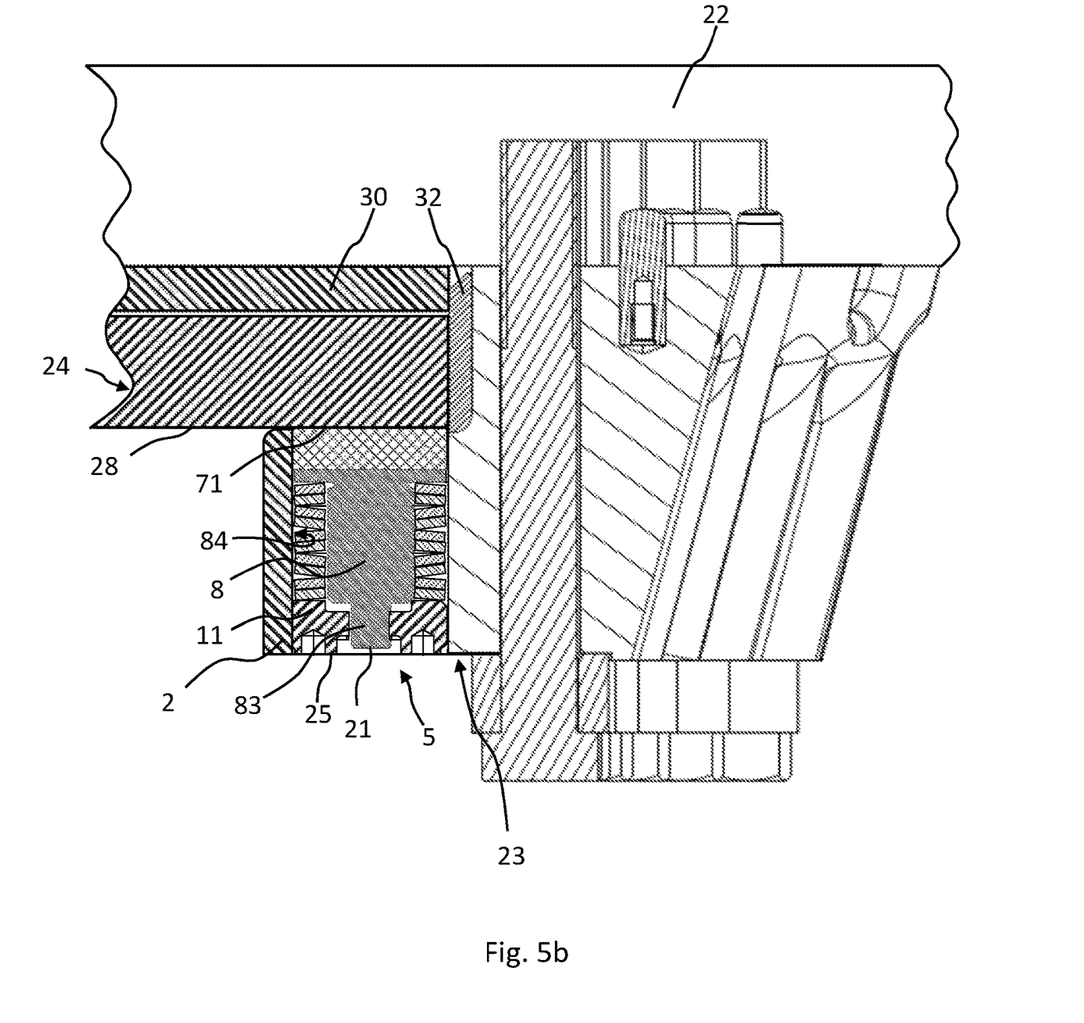
FIG. 5b is a cross-sectional view of the bearing unit of FIG. 4, installed in the yawing system of FIG. 2, following a deterioration of a bearing surface.

FIG. 5b is a cross-sectional view of a bearing unit 5 in which the bearing element 7 has deteriorated. As noted above, the spring stack 9 functions to urge the bearing surface 71 into contact with the lower surface 28 of the gear ring 24. So as the bearing element 7 deteriorates, the spring stack 9 causes the bearing and body elements 7, 8 to translate upwards with respect to the adjuster element 11. This translation, due to the deterioration of the bearing element 7, is indicated by the end surface 21 of the stem 83 having moved from its original position, aligned with the end surface 25 of the adjuster element 11 in a coplanar arrangement, to being located in a plane above the end surface 25 of the adjuster element 11. Typically, the bearing element 7 deteriorates at a rate of around 0.1 mm per year when the wind turbine 10 is operated under normal working conditions. However, due to testing during the commissioning of the wind turbine 10 and while the various components of the yawing system 27 settle down, the initial deterioration rate of the bearing element 7 may be greater than 0.1 mm per year. Translation of the body element 8 away from the adjuster element 11 has the effect of expanding the spring stack 9 which, in turn, reduces the tension force applied to the bearing unit 5, along with the stabilising force on the lower surface 28 of the gear ring 24. In order to re-establish the correct tension force to the bearing unit 5, the adjuster element 11 is turned clockwise, moving it upwards within the bore 84, until its end surface 25 and the end surface 21 of the stem 83 are aligned once again. Over the working lifetime of the bearing unit 5, the distance by which the adjuster element 11 moves upwards within the bore 84 to compensate for the deterioration of the bearing element 7 could be up to 3 mm.

Figure 5C:
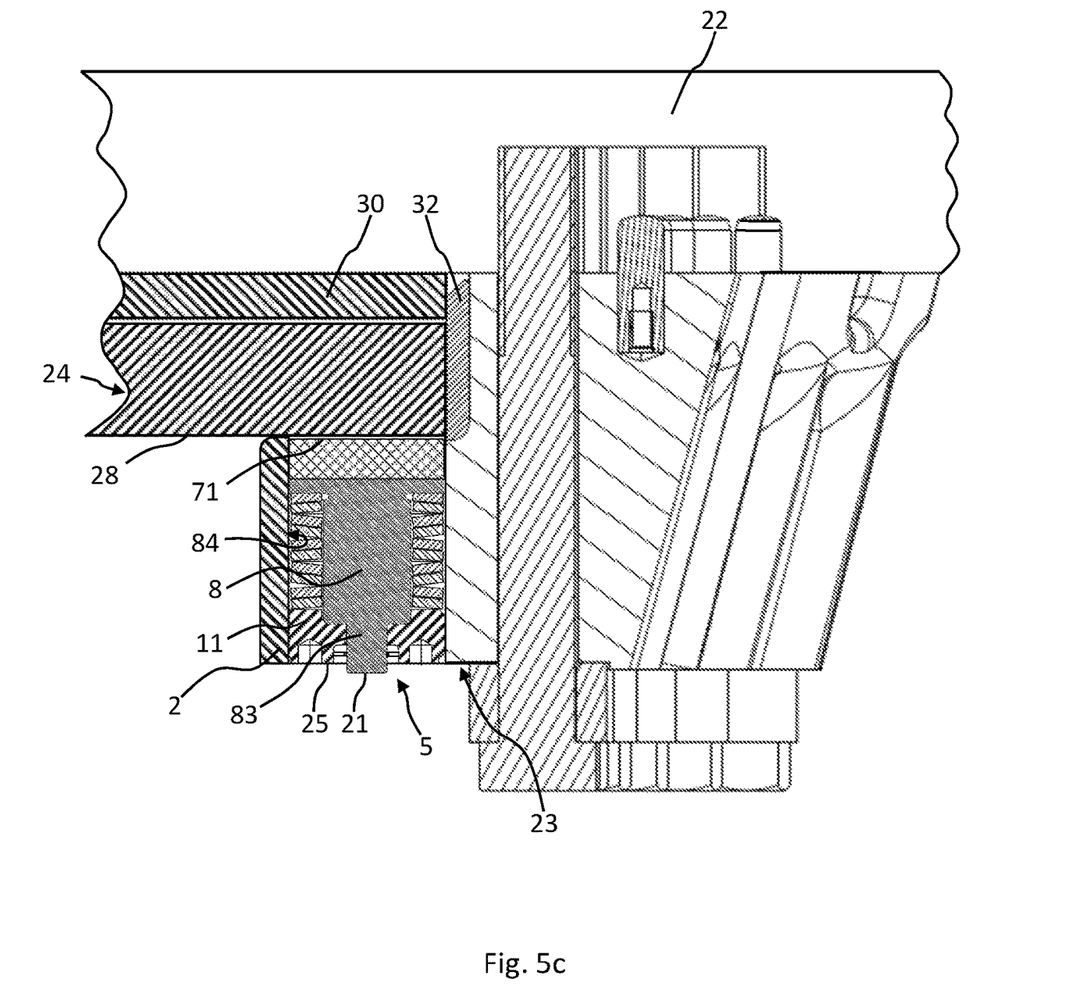
FIG. 5c is a cross-sectional view of the bearing unit of FIG. 4, installed in the yawing system of FIG. 2, following a failure of the disc springs; and, FIG. 6 is a cross-sectional view of the bearing unit of FIG. 4, installed in an alternative yawing system.

FIG. 5c is a cross-sectional view of a bearing unit 5 in which the spring stack 9 has failed, which, typically, is a result of one or more of the annular disc springs breaking. In the event of such a failure, the spring stack 9 is no longer capable of providing the required tension force to the bearing unit 5. As a result, the bearing surface 71 moves away from lower surface 28 of the gear ring 24, and the bearing and body elements 7, 8 translate downwards with respect to the adjuster element 11, as indicated by the end surface 21 of the stem 83 having moved from its original position to being located in a plane below the end surface 25 of the adjuster element 11.

In both instances shown in FIGS. 5b and 5c, the relative movement of the respective surfaces of the adjuster element 11 and the body element 8 provides a visual indication that the tension force applied by the bearing unit 5 has decreased and that corrective action is required.

As noted above, known bearing units are fully housed in the bearing assembly. Accordingly, at least part of the bearing assembly must be dismantled in order to inspect a bearing unit to ascertain whether or not the tension force applied to the bearing unit has decreased. This is labour intensive, particularly when having to inspect multiple bearing units.

A benefit of the bearing unit 5 of the present invention is that it further improves upon known bearing unit designs by providing a means for determining whether the tension force applied to the bearing unit 5 is correct and, if not, what the corrective action is required, in situ (i.e. whilst it is installed in the bearing assembly 23). As such, service personnel can easily ascertain whether or not the bearing unit 5 needs adjusting, or whether a component within the bearing unit 5 has failed, without having to dismantle any aspect of the yawing system 27.

As noted above, the relative positions of the end surfaces 25, 21 of the adjuster element 11 and the stem 83 provide a visual indication that the tension force applied by the bearing unit 5 has decreased. The relative positions of the end surfaces 25, 21 may be assessed by eye or more accurately determined using a specialist measuring tool (not shown in the figures). The measuring tool comprises a measuring instrument using, for example, a laser distance measurer for measuring an offset between the end surfaces 25, 21. In an example embodiment, the measuring tool might form part of the adjustment tool.

In one aspect of the invention, the yawing system 27 comprises a control unit (not shown in the figures) that is operable to monitor the relative positions of the end surfaces 25, 21 and issue a maintenance control signal in the event that the end surfaces 25, 21 move from their coplanar arrangement to become misaligned. To this end, the control unit is operatively coupled to one or more sensors configured to determine the relative positions of the end surfaces 25, 21. The sensors may be mechanical or electromagnetic contacts or proximity sensors, or may form part of a light or laser measuring system. Upon determining that the end surfaces 25, 21 are aligned, the control unit is operable to issue a signal confirming that the bearing unit 5 is correctly pre-tensioned. Alternatively or in addition to this, the adjustment tool may also be operable to provide an indication that the bearing unit 5 is correctly pre-tensioned. Upon determining that the end surfaces 25, 21 misalign, the control unit issues the maintenance control signal, which pertains to information regarding the location and maintenance condition of the bearing unit 5 within the bearing assembly 23. To this end, the maintenance control signal contains information pertaining to whether or not the bearing unit 5 needs adjusting or whether the spring stack 9 has failed and requires replacing. If the control unit determines that the body element 8 has moved upwards relative to the adjuster element 11, the maintenance control signal is configured to indicate a deterioration of the bearing surface 71. Whereas, if it is determined that the body element 8 has moved downwards relative to the adjuster element 11, the maintenance control signal is configured to indicate that the spring stack 9 needs replacing. The control unit includes a transmitter configured to transmit the maintenance control signal wirelessly, or by a wired connection, to a remote server. Alternatively, the maintenance control signal is transmitted directly to an off board device (e.g. a smartphone, a personal computer, etc.) belonging to service personnel.

The benefits of this aspect of the invention are that the control unit automatically determines the tension and maintenance conditions of each bearing unit 5 in situ. As such, maintenance control signals are only ever transmitted to service personnel when a bearing unit 5 needs replacing or adjusting. This reduces the need for regular on-site inspections of the yawing system 27 by service personnel, which can be time consuming, expensive, and labour intensive. Moreover, if service personnel are made aware of the maintenance condition of the bearing units 5 beforehand, it ensures that the maintenance visits carried out by service personnel are efficient as they will already be aware of the location and type of repair and/or adjustment required.

Figure 6:
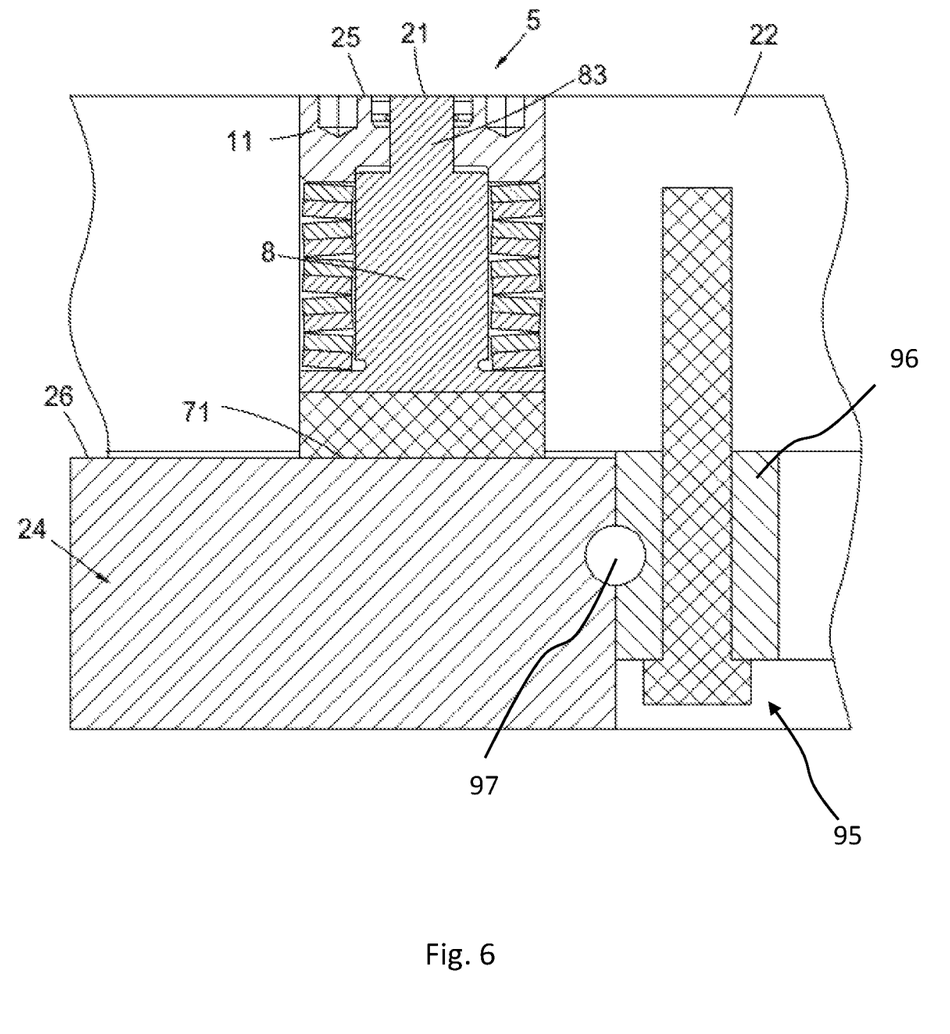

As noted above, the bearing surface 71 of the bearing unit 5 is arranged to contact the lower surface 28 of the gear ring 24. However, in another embodiment, multiple bearing units 5 are arranged to contact the upper surface 26 of the gear ring 24, replacing the horizontal sliding plates 30. FIG. 6 shows a single bearing unit 5 as part of a ball bearing assembly 95, comprising an outer bearing ring 96 and a toothed inner bearing ring 24, fulfilling the function of the gear ring 24 from the previous example. A ball 97 of the ball bearing assembly 95 is marked. Like the horizontal sliding plates 30, the bearing surface 71 of the bearing unit 5 contacts the upper surface 26 of the gear ring 24. Even though this example application of the bearing unit 5 is shown with respect to the ball bearing assembly 95, it will be appreciated that the bearing unit 5 could also replace the horizontal sliding plate 30 of the previously described slide bearing assembly 23. The bearing unit 5 is secured within a bore 84 of the mainframe 22, providing a connection between the mainframe 22 and the gear ring 24, and functions in the same way as the bearing unit 5 contacting the lower surface 28 of the gear ring 24. That is, the end surfaces 21, 25 of the stem 83 and the adjuster element 11 are visible when the bearing assembly 5 is secured to the mainframe 22 so as to indicate when the bearing unit 5 is correctly tensioned and whether the tensioning force applied to the bearing unit 5 has decreased.

It will be appreciated by those skilled in the art that the invention has been described by way of example only, and that a variety of alternative approaches may be adopted without departing from the scope of the invention as defined by the appended claims. For example, it has been described that the spring stack 9 is configured to apply a predetermined tension force to the bearing unit 5 prior to use, and that respective surfaces of the adjuster element 11 and the body element 8 are coplanar when the predetermined tension force is applied and become misaligned when the tension force decreases. In the embodiment of the invention described above, the respective surfaces of the adjuster element 11 and the body element 8 comprise the end surfaces 25, 21 of the adjuster element 11 and the body element 8. However, it will be apparent to the skilled reader that the respective surfaces of the adjuster element 11 and the body element 8 could comprise surfaces alternative to the end surfaces 25, 21 provided that the alternative surfaces are visible during use and are capable of indicating a translation of the body element 8 with respect to the adjuster element 11.

It will also be apparent to the skilled person that the bearing unit 5 described herein is suitable for use with different embodiments of the yawing system 27, such as an embodiment in which the gear ring 24 is rotatably connected to the nacelle 14, either directly or indirectly, as opposed to being fixedly secured to the top of the tower 12, and in which the motors, configured to drive the yawing movement of the nacelle 14, are held stationary with respect to the tower 12.

Moreover, the skilled reader will understand that the bearing unit 5, as defined in the appended claims, is not limited for use in the bearing assemblies 23, 95 described herein and that it could also be used in other types of bearing assemblies used in yawing systems such as, for example, roller bearing assemblies.

The invention claimed is:

1. A bearing unit for a bearing assembly of a yawing system of a wind turbine, the wind turbine comprising a tower and a nacelle connected by the yawing system, wherein the yawing system comprises a gear ring comprising a gear-tooth arrangement configured to interact with a gear wheel of a motor to allow orientation of the nacelle with respect to the tower, the bearing unit comprising:
 an adjuster element arranged to be moveably secured to the bearing assembly and having a first indicator surface;
 a body element translatable relative to the adjuster element and having a second indicator surface;
 a bearing element in contact with the body element, the bearing element comprising a bearing surface for contacting a surface of the gear ring during use; and,
 a biasing means positioned between the body element and the adjuster element for applying a tension force to the bearing unit to bias the bearing element into contact with the surface of the gear ring during use,
 wherein the adjuster element is configured to adjust the tension force applied to the bearing unit by controlling the translation of the body element, and
 wherein the bearing unit is configured such that the first indicator surface of the adjuster element and the second indicator surface of the body element are visible during use, and
 wherein the biasing means is configured to apply a predetermined tension force to the bearing unit when the bearing unit is installed in the bearing assembly prior to use, and wherein the bearing unit is configured such that the first indicator surface of the adjuster element and the second indicator surface of the body element are coplanar when the predetermined tension force is applied.

2. The bearing unit according to claim 1, wherein when the bearing unit is installed in the bearing assembly the second indicator surface of the body element is configured to move upwards or downwards relative to first indicator surface of the adjuster element to indicate that tension force applied to the bearing unit has decreased.

3. The bearing unit according to claim 1, wherein the first indicator surface and the second indicator surface each comprise end surfaces of the adjuster element and the body element, respectively.

4. The bearing unit according to claim 1, wherein the adjuster element comprises an inner surface for limiting the translation of the body element towards the adjuster element.

5. The bearing unit according to claim 1, wherein the bearing surface is arranged to contact a lower surface or an upper surface of the gear ring during use.

6. The bearing unit according to claim 1, wherein the body element is bi-directionally movable relative to the adjuster element.

7. A bearing assembly for a yawing system of a wind turbine, the bearing assembly comprising a bearing unit according to claim 1.

8. A yawing system for a wind turbine, the yawing system comprising a bearing assembly according to claim 7.

9. A wind turbine comprising a yawing system according to claim 8.

10. A bearing unit for a bearing assembly of a yawing system of a wind turbine, the wind turbine comprising a tower and a nacelle connected by the yawing system, wherein the yawing system comprises a gear ring comprising a gear-tooth arrangement configured to interact with a gear wheel of a motor to allow orientation of the nacelle with respect to the tower, the bearing unit comprising:
 an adjuster element arranged to be moveably secured to the bearing assembly and having a first indicator surface;
 a body element translatable relative to the adjuster element and having a second indicator surface;
 a bearing element in contact with the body element, the bearing element comprising a bearing surface for contacting a surface of the gear ring during use; and
 a biasing means positioned between the body element and the adjuster element for applying a tension force to the bearing unit to bias the bearing element into contact with the surface of the gear ring during use,
 wherein the adjuster element is configured to adjust the tension force applied to the bearing unit by controlling the translation of the body element,
 wherein the bearing unit is configured such that the first indicator surface of the adjuster element and the second indicator surface of the body element are visible during use, and
 wherein the body element comprises a stem and the adjuster element comprises an open bore through which the stem is slidably received.

11. The bearing unit according to claim 10, wherein the stem comprises a retaining means arranged to limit the translation of the body element away from the adjuster element.

12. The bearing unit according to claim 10, wherein when the bearing unit is installed in the bearing assembly the second indicator surface of the body element is configured to move upwards or downwards relative to first indicator surface of the adjuster element to indicate that tension force applied to the bearing unit has decreased.

13. The bearing unit according to claim 10, wherein the first indicator surface and the second indicator surface each comprise end surfaces of the adjuster element and the body element, respectively.

14. The bearing unit according to claim 10, wherein the adjuster element comprises an inner surface for limiting the translation of the body element towards the adjuster element.

15. The bearing unit according to claim 10, wherein the bearing surface is arranged to contact a lower surface or an upper surface of the gear ring during use.

16. The bearing unit according to claim 10, wherein the body element is bi-directionally movable relative to the adjuster element.

17. A bearing assembly for a yawing system of a wind turbine, the bearing assembly comprising a bearing unit according to claim 10.

18. A yawing system for a wind turbine, the yawing system comprising a bearing assembly according to claim 17.

* * * * *